| TEMPERATURE COEFFICIENT | K CONVENTIONAL | K NOVEL | NOVEL COMPOSITION ZIRCONIA | CLAY | $MgTiO_3$ | $CaTiO_3$ |
|---|---|---|---|---|---|---|
| NPO | 29-38 | 14 | 5% | 2% | 91% | 2% |
| N030 | 30-32 | 14.1 | 5% | 2% | 89% | 4% |
| N080 | 35-38 | 16.2 | 5% | 2% | 84.4% | 8.6% |
| N150 | 42 | 18.8 | 5% | 2% | 80.9% | 12.1% |
| N220 | 47 | 21.7 | 5% | 2% | 77.6% | 15.4% |
| N330 | 53 | 26.3 | 5% | 2% | 73.1% | 19.9% |
| N470 | 62 | 32.2 | 5% | 2% | 68% | 25% |
| N750 | 87-95 | 47 | 5% | 2% | 56.5 | 36.5% |

ALL ABOVE COMPOSITIONS HAVE THE FOLLOWING LIMITS:
±5% ON THE MAJOR CONSTITUENT ($MgTiO_3$) AND
±10% ON THE MINOR CONSTITUENT ($CaTiO_3$)

INVENTOR.
ASRU K. DAS GUPTA
BY
Ostrolenk & Faber
ATTORNEYS

April 10, 1956 A. K. DAS GUPTA 2,741,561

COMPOSITION AND METHOD OF MAKING LOW DIELECTRIC CAPACITORS

Filed Aug. 13, 1953 2 Sheets-Sheet 2

INVENTOR.
ASRU K. DAS GUPTA
BY
Ostrolenk & Faber
ATTORNEYS

United States Patent Office 2,741,561

Patented Apr. 10, 1956

2,741,561

COMPOSITION AND METHOD OF MAKING LOW DIELECTRIC CAPACITORS

Asru K. Das Gupta, Huntington Park, Calif., assignor to Solar Manufacturing Corporation, Los Angeles, Calif., a corporation of New York Application August 13, 1953, Serial No. 374,093

11 Claims. (Cl. 106—39)

The present invention relates to a novel electrical capacitor and its manufacture and more particularly relates to a novel composition of ceramic for capacitors of relatiively low capacity.

It is well-known that due to the development of television higher and higher frequencies are now being used in electrical communications. Quite recently, in fact, the F. C. C. opened to electrical communications the U. H. F. band from 400 up to approximately 1,000 megacycles.

At such high frequencies lumped electrical elements change considerably in their characteristics as compared with their corresponding low frequency values. For example, approaching this problem dimensionally, it is seen that as the frequency increases generally the dimensions of the electrical components must be made smaller. A coil used at low frequencies may have a considerably large number of turns and be of considerable physical dimensions. A coil for use at U. H. F. will have very few turns and will be of very small physical dimensions.

Similarly, capacitors at low frequencies may have fairly large dimensions but as the frequency goes higher and the desired capacitance becomes smaller, the size of the capacitor also becomes smaller and in fact it may become so small that its manufacture becomes difficult and the end product has relatively narrow tolerance.

Up to now the development of the capacitor art has been toward improved dielectrics having relatively higher and higher dielectric constants. This development of dielectrics having higher K values made it possible to provide capacitors with increasing capacitances while keeping the dimensions of the capacitor within reasonable limits. Stated otherwise, by improving the K, the capacity of the capacitor could be increased without increasing the area and therefore the amount of material used.

However, when the capacitor is to operate at U. H. F. and a dielectric of very large dielectric constant K is selected, it is found that in order to arrive at the very small capacity used at U. H. F., i. e. 5, 10 or 15 micromicrofarads, the dimension of the capacitor becomes so small, i. e. of the order of one quarter inch diameter, that manufacture of the same becomes difficult. In other words, the improved K factor which had been a great advantage where large capacity capacitors were involved became a serious defect for low capacity capacitors.

In addition, as the frequency of operation was pushed to higher and higher values for any given dielectric of a capacitor, the thickness and the dimensions of the capacitor plates, the type of leads and the length of the leads, the surrounding insulators produce changes in the end product and such changes will be enhanced if the dielectric itself does not have the required capacity.

Capacitors moreover are often required to have a capacitance which can vary inversely with temperature to compensate for the opposite change in inductance of the coils used in certain electrical circuits, for example, in the oscillator circuits of television sets.

Again heretofore these temperature compensating capacitors used dielectrics having a very high K which in some cases, for example in the case of a capacitor that has a temperature coefficient of −750 parts in a million per degree centigrade, can be as high as 100. This high value of dielectric constant was inherent with the particular ceramic selected to have the above-mentioned negative co-efficient of temperatures.

Furthermore, when used at U. H. F. it is necessary to have capacitors with high Q's or very low power factor so that the loss at ultra-high frequencies in these capacitors can be kept at a minimum.

To examine these problems more specifically, as is well known, the capacitance of a dielectric plate is related to its dimensions and the dielectric constant by the following expression:

$$C=\frac{kKA}{t}$$

where C is the capacitance of the dielectric; $k$ is a numerical constant; K is the dielectric constant; A the area of the dielectric or of the capacitor plates; $t$ the thickness of the dielectric.

From this equation it is immediately evident that if it is desired to obtain very small capacities with a certain specified percentage of tolerance, three parameters may be varied, A, $t$, and K.

Assuming first that the area A is reduced to obtain very small capacitances of the order of magnitude of five micromicrofarads, it is easily seen that the area A must be very small if K and $t$ have the same values used for larger capacitances. At first sight it may seem that it would simply be necessary to decrease the area A to actually produce satisfactory capacitors having the desired low micromicrofarad capacitances. Unfortunately this is not so since the area A is then so small that a slight error in the dimensions during manufacture will cause a relatively large percentage change in the capacitance of the dielectric and therefore of the end product.

On the other hand, for large capacity capacitors where the area A is relatively large in the first place, any small change during manufacture will produce a relatively small percentage change in the capacitance of the end product. To be more specific, in the case of a capacitor having a small area, a small change during production in area for the small area A means a large percentage change of A, and therefore of capacity. In the case of the same capacity capacitor having large area A, a small change in A will actually be a small percentage change in area and therefore of capacitance. Accordingly, in the mass production of the small area capacitors the number of rejects due to variances from the desired capacitance will more than offset the savings in material due to reduced area and make such capacitors uneconomical. Thus as will now be clear, the apparent advantage of reducing the area A of the dielectric which would seem to be an economic advantage since it would mean that for a given area of dielectric the yield may be made quite high is only apparent since actually because of the poor tolerance obtainable, with small area capacitors, the number of rejects due to fluctuations beyond the permissible tolerance would be such that the actual yield may become very small, thus turning the economic advantage into an economic loss.

Assuming now that K and A are kept at the values commonly used at lower frequencies, it is seen that in order to reduce C to very small values, the thickness of the dielectric $t$ must be increased. Again here at first sight this may appear possible, but it is found that as $t$ of the ceramic is increased, the ceramic introduces problems. The ceramics used are relatively non-plastic. They tend to laminate in manufacture which at any great thickness produce a final dielectric not acceptable because of the increased loss due to poor power factor of the capacitor.

Accordingly, the present invention relates to a novel composition of ceramic for capacitors having not only the desired temperature compensating characteristics but a relatively low dielectric constant so that the resulting end product, namely the capacitor itself, may have the desired tolerance without making the manufacturing process in any way more complex than the one previously used.

In fact, from the above equation it is seen that the capacitance of a dielectric can be decreased by decreasing the value of the dielectric constant K while still maintaining A and $t$ at reasonable values. This, therefore, makes possible not only capacitors with fairly large areas and, therefore, good tolerance but also capacitors with small thickness with no tendency to laminate.

It is necessary to point out that while the area A was mentioned as being fairly large, it is to be understood that the area A should, of course, be small enough so that whe nthe conductive plates of the capacitor are placed on each side of the dielectric, the inductive effect of the plates should be negligible.

As previously mentioned, these very small capacitors are generally to be used at frequencies sometimes of the order of magnitude of 1,000 megacycles and at these frequencies they must present a very low power factor and, therefore, low losses.

A complete capacitor using any dielectric can be represented by an inductance coil L in series with a resistance R and the parallel combination of the capacitance C and conductance G where the inductance L takes into account the magnetic effect of the currents in the capacitor and to a first approximation may be considered independent of the capacity or the frequency: it depends essentially upon the physical size of the capacitor and the method of connecting leads to the capacitor plates.

This inductance is reduced by making the capacitor of small physical size and by positioning the leads at the center of the plates. The effect of this inductance is to cause the capacitance at the terminals of the capacitor, also called apparent capacitance, to be greater than the actual capacity C.

The conductance G represents the losses in the dielectric and is proportional to the frequency and often is said to take into account the so-called hysteresis losses of the dielectric. The resistance R represents the series resistance of the leads of the capacitor and increases with frequency as the result of skin effect being proportional to the square root of the frequency at high frequencies.

The power factor of a capacitor whose equivalent circuit is the one above-described is the ratio of the equivalent series resistance of the capacitor over the actual reactance of the capacitor at the frequency at which the power factor is to be known. The reciprocal of the power factor is called the Q of the capacitor.

While the power factor of a capacitor is determined primarily by dielectric losses G at low frequencies and by the series resistance R at high frequencies, it is necessary always to provide a dielectric having a value of G approaching zero and, therefore, a dielectric having practically infinite shunt resistance.

With such a dielectric, the Q would, of course, be high and the power factor low. In the novel ceramic of the present invention it is found that the value of G is very large and the Q is close to 1,000.

In the present invention the above-mentioned problems are solved through the discovery of a novel composition of dielectric material of the ceramic type having a desired negative co-efficient of temperature and a sufficiently low dielectric constant to make the production feasible.

Accordingly, one object of the present invention is a novel capacitor having a novel ceramic.

Another object of the present invention is a novel composition of the ceramic type for use as a dielectric in small capacitors.

Still another object of the present invention is the production of a series of temperature compensating ceramic dielectrics for use in capacitors.

A further object of the present invention is a novel ceramic having a relatively low dielectric constant and any desired temperature compensating characteristics.

Still another object of the present invention is a novel ceramic having low loss at high frequency and, therefore, low power factors or high Q at these high frequencies.

Another object of the present invention is a ceramic dielectric for use in capacitances of small tolerance.

Still another object of the present invention is a novel process of manufacture for capacitors.

The foregoing and many other objects of the invention will become apparent in the following description and drawings in which.

In accordance with the present invention, the novel dielectric is a ceramic composed of the following substances: calcium titanate, magnesium titanate, clay and zirconium oxide.

Actually, although hereinafter the final composition will be given, such as calcium titanate and magnesium titanate, it is to be understood that this novel ceramic is not obtained by combining these final substances but they are obtained as a result of putting in the ceramic calcium carbonate, magnesium carbonate, titanium oxide in raw material form to form the above-mentioned calcium titanate and magnesium titanate.

Figures 1, 2:
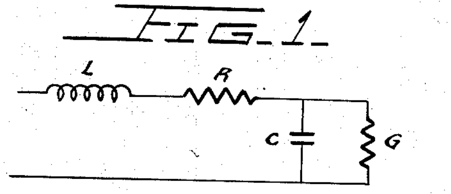
Figure 1 is the electrical equivalent circuit of a capacitor.
Figure 2 is a table showing the composition and the dielectric constant of one series of the novel ceramic as compared with the dielectric constant of conventional ceramics for different values of temperature co-efficient.
Figure 3:
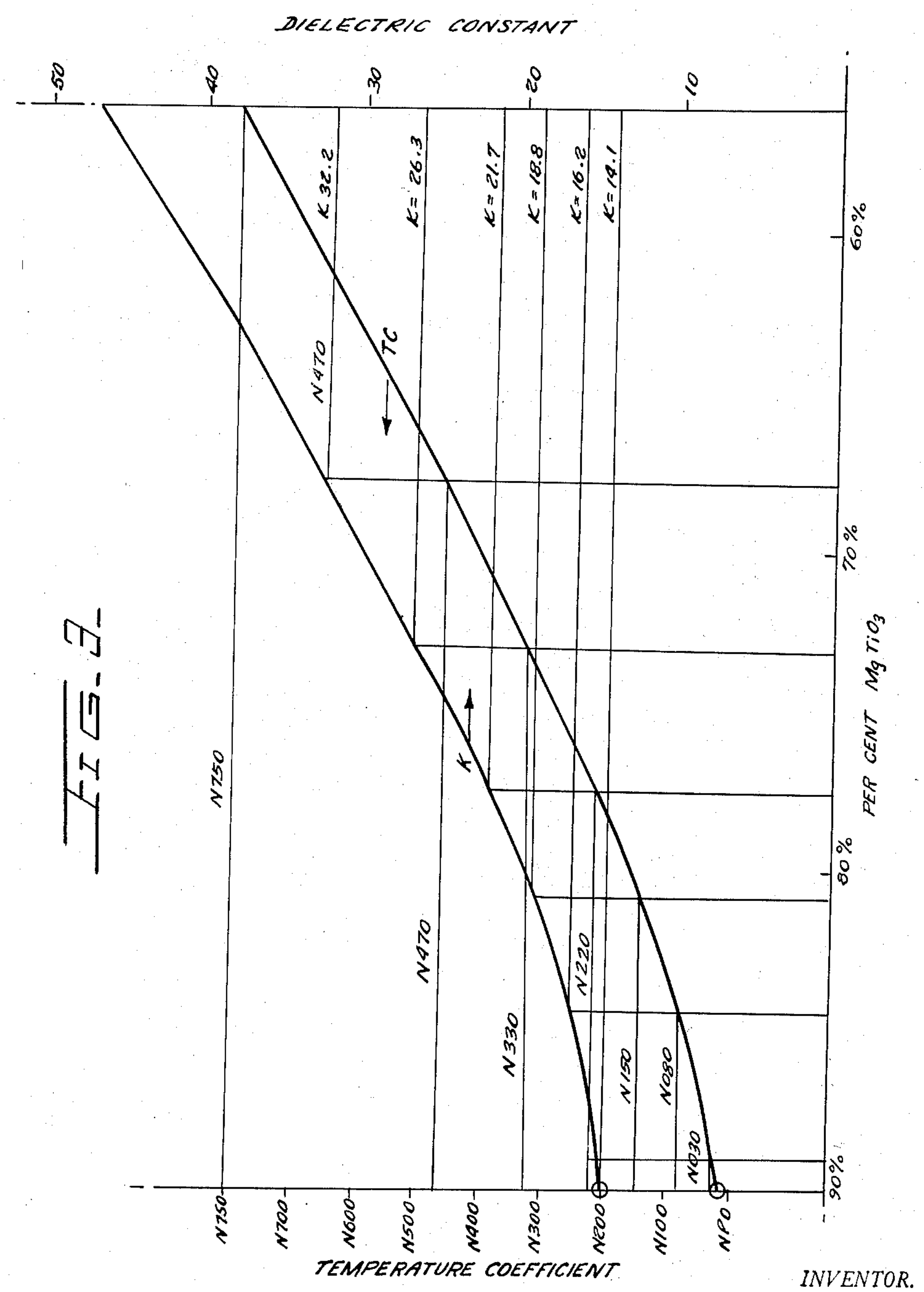
Figure 3 is a set of curves showing the variation of the temperature co-efficient and of the dielectric constant with respect to percentage composition of $MgOTiO_2$ for the series of ceramic dielectrics of Figure 2.

For a specific series of the novel temperature compensating ceramic dielectric such as that shown in Figures 2 and 3, the percentage composition of clay and zirconium oxide is constant while the calcium titanate and magnesium titanate will change percentagewise depending on the temperature coefficient required.

A temperature coefficient will hereinafter be denoted by, for example, N750 where N stands for negative coefficient of temperature (a substance, therefore, whose dielectric constant decreases with temperature) and 750 means that its dielectric constant K will change by 750 parts per million per degree centigrade change in temperature. To give another example, NP0 is the negative positive zero coefficient of temperature i. e. it represents a point where there is neither a positive nor a negative temperature coefficient. Thus the dielectric constant of the particular substance having NP0 as the coefficient of temperature does not change with temperature within a certain range of temperatures.

Referring to Figures 2 and 3 it is there seen, for example, that for a ceramic having a temperature coefficient of N750, the conventional K was of 87 to 95 while with our novel composition of 5% zirconium oxide by weight, 2% clay by weight, 56.5% magnesium titanate by weight, and 36.5% calcium titanate by weight, the dielectric constant is found to be between 30 and 47, less than one-half of the dielectric constant of conventional ceramics. Figure 3 correlates graphically the K values of a series of dielectrics of temperature coefficients ranging from zero to 75° and containing varying amounts of magnesium and calcium titanates. Each member of the said series contains 5% zirconium oxide, while the percentage of magnesium titanate may vary from 56.5% to 91%.

Of the compositions shown in the above tables, it should be noted that they have the following limits: + or −5% for the major constituent ($MgTiO_3$) and + or −10% of the minor constituents $CaTiO_3$. The clay appears to have essentially two functions. One of these functions is to lower the maturing temperature of the ceramic, that is, the temperature at which the ceramic material becomes dense and therefore, becomes useful as a capacitor. Density is not to be taken as meaning that it has a high mass per unit volume but that it is completely vitrified or has no porosity. A second function of the clay is to make the combination more plastic, therefore aiding in the steps of pressing, extruding, etc.

The zirconium oxide ($ZrO_2$) apparently lowers the power factor of the dielectric or increases the Q of the dielectric which must be very high at U. H. F. As can be seen in Figure 1, the effect of zirconium oxide seems to be that of decreasing the value of the conductance G and, therefore, also of decreasing the equivalent series resistance of the complete capacitor and correspondingly by decreasing the power factor and increasing the Q.

It is important to point out that the percentage of $ZrO_2$ determines the specific series of temperature compensation dielectric; so that if the percentage of $ZrO_2$ by weight is 5%, the corresponding series will have a K varying from 14 for an NP0 dielectric to 47 for an N750 dielectric.

Other series with dielectric constants lower than 14 can be obtained by using a higher percentage of $ZrO_2$, up to approximately 15% of $ZrO_2$ by weight.

These additional series may have dielectric constants ranging from 25 to 40 or from 10 to 25, or from 9 to 22, where the lower value is for NP0 and the higher for N750. It is obvious that if the percentage of the dielectric $ZrO_2$ is changed within the above limits, the compositions of CaO, MgO and $ZrO_2$ should be changed to obtain ones similar to those shown in Figure 3.

If then we take into consideration the raw materials, namely $CaCO_3$, $MgCO_3$ and $TiO_2$ it is found that for a dielectric having a temperature co-efficient of NP0 in the temperature range between 25 to 85° C., the raw material composition will be as follows where the percentages are given in weight: 48.6% of MgO, 1.4% of CaO and 50% of $TiO_2$. For a dielectric having a coefficient of temperature of N750, the composition of the raw materials will be as follows: 31.9% MgO, 18.1% CaO and 50% $TiO_2$.

It is possible, of course, to express the above quantity in mol percentage so that, for example, for a ceramic having a temperature co-efficient of N350, the composition of the raw materials will be as follows: 40 mol percent MgO, 10 mol percent CaO, 50 mol percent $TiO_2$. To these materials, as previously mentioned, is to be added 2% clay in weight and 5% of chemically pure zirconium oxide, also in weight.

It was mentioned above that the addition of zirconium oxide seems to improve the Q considerably and to reduce the power factor at high frequencies. It is necessary here to point out that not only the zirconium oxide but also the titanates used, namely $CaTiO_3$ and $MgTiO_3$, cause the ceramic to have a much smaller loss at high frequency than conventional dielectrics having as base composition titanium oxide ($TiO_2$) which at high frequencies has a high loss and therefore, referring to Figure 1, a high G.

In the manufacture of this novel ceramic, 99% pure raw materials are selected, namely calcium carbonate, magnesium carbonate and titanium oxide. Impurities such as iron oxide and silica must be eliminated from the raw materials as much as possible. The zirconium oxide must also be chemically pure.

The above-mentioned ingredients should be of such size as to pass through a screen of 320 mesh since the process of manufacturing the ceramic is a solid reaction.

In the second step of the process for manufacturing, the ingredients are wet mixed or in other words they are blunged or ball milled so that a perfect homogeneity is obtained in mixing and subsequent material will have good uniformity.

In the mixing process the clay acts as an inorganic deflocculant to reduce the amount of water to be added in milling, and to reduce the drying time. By deflocculant, it is here meant an agent that causes the dispersion of the ingredients in the form of particles resulting in thinning of the suspension.

Following the wet mixing the mixture is dried for a period of approximately six to seven hours where the drying process, as previously mentioned, is aided by the clay.

The fourth step is that of calcination, the object of which is twofold: (*a*) to prepare the material for easy blending, that is, for making the magnesium carbonate and calcium carbonate which are sources of magnesium oxide and calcium oxide, easy to handle in the pressing operation. In fact, generally magnesium carbonate and calcium carbonate are very bulky and cannot be handled easily during the pressing operation unless calcination is made.

(*b*) It is desirable to have the solid reaction start one stage ahead of the final curing since if this is not done, even if the pieces are pressed correctly or fabricated correctly on account of the expulsion of carbon dioxide from these carbonates, namely from calcium carbonate and magnesium carbonate, pinholes or bloatings are produced in the pieces.

The operation of calcination is conducted normally at about 1400° C. so that carbon dioxide is completely expelled and the calcined product now is easier to handle properly. Calcination is conducted usually in a container made of zirconium oxide or a container covered with zirconium oxide so that the mixture to be calcined will not react with the container. We can also say that for that particular mixture the zirconium container is inert.

After calcination the material is pulverized again or milled. Always with the addition of distilled water. The object of pulverization is to make possible the shaping of the pieces of dielectric.

In the process of pulverization, additional clay and zirconium oxide are added. More specifically, 1% of the clay is added in the second step or in the milling operation while the other 1% of clay is added in this pulverization operation. The addition of clay, as was mentioned previously, is for producing good dispersion of the ingredients. The pulverization product should be of size 200 mesh. A further size reduction to 320 mesh can still give a workable product.

Following the step of pulverization, the material is mixed with binders to give the material artificial plasticity. It is known, in fact, that the main ingredients of the present ceramic are not plastic, and clay produces only very little plasticity. The binders preferably used in the present process for adding artificial plasticity to the material are paraffin wax, polyvinyl alcohol, wax emulsion (paraffin wax emulsion).

In the next step the material provided with binders is dried and then pressed in preparation for firing. The pressure used in the pressing operation which is performed in appropriate presses may vary from 1,000 pounds per square inch to 5,000 pounds per square inch for the ¼" size dielectrics. In the case of the ¼" size dielectrics, it was actually found that the optimum pressure was 1,000 pounds per square inch. It is necessary to point out that such pressure depends on size, thickness and the exact nature of the material being pressed. While it is difficult to determine the optimum pressure, it is possible to determine whether pressure is generally correct:

(*a*) If the resultant disc or odd shaped piece is rigid enough to be handled and does not fall apart.

(b) If no lamination is present in any section of a piece.

(c) If there are no blisters.

(d) If no marks appear on the pieces when they are pressed.

In addition, it is found that if the correct pressure was used during the pressing operation, the maturity of the piece after the firing operation which is subsequent to the pressing operation will then be correct.

The standard test for maturity is made in terms of porosity by a dye penetration test. In the present manufacturing process, the dye used is fuchsia dye, 1/100% in alcohol solution and the pieces are subjected to 10,000 pounds of hydrostatic pressure for four hours.

In other words, the pieces are immersed in the fuchsia dye and alcohol and the solution is then subjected to the above-mentioned pressure. After the test there must be no penetration of the dye in the pieces.

If the pieces have been underpressed, the particles will not meet to constitute the piece since, as previously mentioned, this is a solid state reaction. If the pieces are underpressed, no vitrification occurs. If the pieces have been overpressed on the other hand, lamination occurs and this lamination results during firing in blowing up, completely exploding the pieces or sometimes it results in a blur on the surface or a little bubble which indicates that the piece is not perfectly mature.

It is found that the pressure time for relatively small pieces is of about one second, while the pressure time for large pieces goes up to three seconds.

Following the pressing operation, the pieces are fired where firing serves to develop the properties of the final material such as the dielectric constant K, the power factor, the temperature coefficient of the capacitor, the leakage resistance or leakage conductance, the frequency characteristics vs. capacitance or the capacitance vs. frequency characteristic or the capacitance vs. voltage characteristic.

The firing operation must be done in a distinct oxidizing atmosphere in a kiln, there being 1.2% of excess oxygen. It is actually found that when excess oxygen is less than .2%, the power factor of the dielectric increases with a consequent decrease in Q. The need for the excess oxygen may be caused by the fact that titanium can be either tetravalent and also bivalent and very mobile, that is, it can change from one state (high) of oxidation to another state (low) of oxidation. That is, it can change from the titanic form to the titanous form, respectively.

In the present ceramic the high state or titanic state is needed since in the titanous state the electric conductivity becomes high and all other undesirable electrical characteristics of such an insulating material appear in the dielectric.

Apparently oxygen helps to retain the titanium in the highest oxidation state. It appears also that no oxygen is lost in the process of firing so that a conclusion may be drawn that oxygen itself does not combine chemically during this operation.

Firing is done at 300° F. per hour rise from room temperature up to about 50 or 80° below the peak temperature. Firing is performed with a solid piece of stabilized zirconia where the zirconia must be free from all kinds of impurities such as silica or iron oxide.

In the firing operation the clay present acts as a flux to reduce the maturing temperature of the composition.

It is necessary to point out that the firing operation is done on the finally shaped dielectrics.

Following the firing operation comes a process not directly related to the manufacture of the dielectric, namely the application of the silver electrodes, the leads and the surrounding insulation which serves to protect the dielectrics and the silver electrodes.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A ceramic for a capacitor consisting essentially of, by weight, 5 to 15 per cent zirconium oxide, 56.5 to 91 per cent magnesium titanate and 2 to 36.5 per cent calcium titanate.

2. A ceramic for a capacitor consisting by weight of 5 to 15 per cent zirconium oxide, 56.5 to 91 per cent magnesium titanate, 2 to 36.5 per cent calcium titanate and 2 per cent clay.

3. A ceramic for a capacitor, consisting by weight, of 5 to 15 per cent zirconium oxide, 56.5 to 91 per cent magnesium titanate, 2 to 36.5 per cent calcium titanate, and an amount up to 2% of clay sufficient to lower the maturing temperature of the said mixture.

4. A ceramic for a capacitor consisting esssentially of, by weight, 5 to 15 per cent zirconium oxide, 56.5 to 91 per cent magnesium titanate and 2 to 36.5 per cent calcium titanate, the ingredients being of particle size finer than 320 mesh.

5. A ceramic for a capacitor consisting by weight of 5 to 15 per cent zirconium oxide, 56.5 to 91 per cent magnesium titanate, 2 to 36.5 per cent calcium titanate and an amount up to 2 per cent clay, the ingredients being of particle size finer than 320 mesh.

6. A ceramic for a capacitor having a relatively low dielectric constant consisting by weight of calcium titanate 2 to 4 per cent, magnesium titanate 89 to 91 per cent, clay in an amount up to 2 per cent, and zirconium oxide 5 to 15 per cent.

7. A ceramic for a capacitor having a relatively low dielectric constant consisting by weight of calcium titanate 12.1 per cent ±10 per cent, magnesium titanate 80.9 per cent ±5 per cent, clay in an amount up to 2 per cent, and zirconium oxide 5 to 15 per cent.

8. A ceramic for a capacitor having a relatively low dielectric constant consisting by weight of calcium titanate 25 per cent ±10 per cent, magnesium titanate 68 per cent ±5 per cent, clay in an amount up to 2 per cent, and zirconium oxide 5 to 15 per cent.

9. A ceramic for a capacitor having a relatively low dielectric constant consisting by weight of calcium titanate 19.9 per cent ±10 per cent, magnesium titanate 73.1 per cent ±5 per cent, clay in an amount up to 2 per cent, and zirconium oxide 5 to 15 per cent.

10. A ceramic for a capacitor having a relatively low dielectric constant consisting essentially of, by weight, calcium titanate 36.5 per cent ±10 per cent, magnesium titanate 56.4 per cent ±5 per cent, and zirconium oxide 5 to 15 per cent.

11. The process of producing a low dielectric ceramic for a capacitor consisting essentially of, by weight, 5 to 15 per cent zirconium oxide, 56.5 to 91 per cent magnesium titanate and 2 to 36.5 per cent calcium titanate, the said process comprising mixing 99 per cent pure calcium carbonate, magnesium carbonate, titanium oxide, pure zirconium oxide and clay from which impurities have been removed, the said components having a particle size finer than 320 mesh; wet ball milling the mix to produce a substantially perfect homogeneity, drying the mix, calcining the mix at an elevated temperature of the order of 1400° C., pulverizing the calcined product, adding sufficient additional zirconium oxide so that the final mixture contains between 5 to 15 per cent zirconium oxide, plasticizing the resulting composition and adding an amount of clay up to 2 per cent to lower the maturing temperature of the composition, and pressing and firing the composition in an oxidizing atmosphere.

References Cited in the file of this patent

UNITED STATES PATENTS

| | | |
|---|---|---|
| 2,580,708 | Wallace et al. | Jan. 1, 1952 |
| 2,696,651 | Gravley | Dec. 14, 1954 |